United States Patent [19]
Perrett

[11] Patent Number: 5,326,416
[45] Date of Patent: Jul. 5, 1994

[54] HEAT SEALING JAW ASSEMBLY WITH FILM SLACKENER

[75] Inventor: Arnold E. Perrett, Whitby, Canada

[73] Assignee: Du Pont Canada Inc., Mississauga, Canada

[21] Appl. No.: 45,296

[22] Filed: Apr. 13, 1993

[30] Foreign Application Priority Data

Apr. 15, 1992 [CA] Canada ................................ 2066068

[51] Int. Cl.⁵ .......................................... B32B 31/00
[52] U.S. Cl. .................................... 156/251; 156/515; 156/583.1; 156/583.2
[58] Field of Search ............... 156/250, 251, 256, 515, 156/530, 580, 583.1, 583.2, 583.3; 100/38, 39, 93 P

[56] References Cited

U.S. PATENT DOCUMENTS

| | | | |
|---|---|---|---|
| 3,692,613 | 9/1972 | Pederson | 156/498 |
| 3,775,225 | 11/1973 | Schott, Jr. | 156/510 |
| 3,874,976 | 4/1975 | MacFarland, Jr. | 156/515 |
| 4,115,182 | 9/1978 | Wildmoser | 156/515 |
| 4,512,138 | 4/1985 | Greenwalt | 53/451 |
| 4,744,845 | 5/1988 | Posey | 156/159 |
| 4,761,197 | 8/1988 | Christine et al. | 156/290 |

FOREIGN PATENT DOCUMENTS

1445557 7/1968 France.

Primary Examiner—David A. Simmons
Assistant Examiner—J. Sells
Attorney, Agent, or Firm—Konrad S. Kaeding

[57] ABSTRACT

A heat sealing assembly, for sealing through at least two layers of thermoplastic film is disclosed. It is particularly adapted for use with a vertical form, fill and seal machine for packaging flowable materials. The heat sealing assembly comprises two jaws, resilient clamping elements and a heat sealing element, at least one of the jaws being capable of transverse motion and adapted to collapse a tubular film made from the thermoplastic film and passing between the jaws, each of said jaws having said element mounted thereon, said clamping elements being adapted to grip thermoplastic film which passes therebetween and urge said gripped film towards said jaws when the jaws close and to release said film when the jaws open. Clamping is accomplished without an activating device other than the jaws themselves. Preferably there are clamping elements on both sides of the jaws. Preferably the clamping elements are made of a flexible rubber.

4 Claims, 2 Drawing Sheets

HEAT SEALING JAW ASSEMBLY WITH FILM SLACKENER

BACKGROUND AND SUMMARY

The invention relates to a heat sealing device useful for making pouches filled with flowable materials, e.g. thick sauces and dressings, particularly to pouches made on so-called vertical form, fill and seal machines.

It is well known to package flowable materials, for example, milk, on so-called vertical form, fill and seal machines. Using one such a machine, a flat web of thermoplastic film is unwound from a roll and formed into a continuous tube in a tube forming section, by sealing the longitudinal edges of the film together to form a so-called lap seal or a so-called fin seal. The film tube thus formed is pulled vertically downwards to a filling station. The tube is then collapsed across a transverse cross-section of the tube, the position of the cross-section being at a sealing device below the filling station. A transverse heat seal is made, by the sealing device, at the collapsed portion of the tube, thus making an airtight seal across the tube. The sealing device generally comprises a pair of jaws. After the jaws are closed and while the transverse seal is being made, a quantity of material to be packaged, e.g. liquid, is caused to enter the film tube, at the filling station, and fill the tube upwardly from the aforementioned transverse seal. When the jaws are opened the film tube is then caused to move downwardly a predetermined distance. Such movement may be under the influence of the weight of the material in the tube, or may be caused by pulling or mechanically driving the tube. The jaws of the sealing device are closed again, thus collapsing the tube at a second transverse section. The second transverse section may be above, usually just above, the air/material interface in the tube, or the second transverse section may be below the air/material interface. The sealing device clamps, seals and severs the tube transversely at the second transverse section. The material-filled portion of the tube is now in the form of a pillow shaped pouch. Thus the sealing device has sealed the top of the filled pouch, sealed the bottom of the next-to-be formed pouch, all in one operation. Contamination of the heat sealing surfaces of the tube may occur due to splashing or drooling of the material to be packaged. One such vertical form and fill machine of the type described above is sold under the trade mark PREPAC. Other machines may be operated such that the material-to-be-packaged is caused to enter the tube continuously rather than intermittently as described above. As a result, sealing of the film takes place with material-to-be-packaged between the heat sealing surfaces in the tube.

With some other machines, the sealing device does not sever the tube at the second transverse section, but does sever the tube subsequently. With yet other machines the jaws of the heat sealing device reciprocate up and down. With such machines, the jaws clamp, seal and sever the tube of film while moving in a downward direction, the jaws then open and return upwards in the open position. The downward movement of the closed jaws also serve to advance the tubular film downwardly.

For many years, milk has been packaged in pouches made on vertical form and fill machines. Such pouches have been sold to household consumers and, in use, such milk-filled pouches are stood within an open-mouthed pitcher. More recently, such pouches have been used to package other flowable comestibles, mayonnaise, caramel, scrambled eggs, tomato ketchup, chocolate fudge, salad dressings, preserves and the like. Pouches containing such comestibles are usually sold to "institutional" buyers, e.g. restaurants.

A sealing device commonly used is a so-called "impulse sealer" in which an electrical current flows through the sealing element for only a fraction of the cycle time between operations. The impulse sealer may be a round wire, e.g. a "piano" wire about 2.0 mm to 2.3 mm diameter, electrically insulated from a water-cooled supporting jaw. After the electrical impulse is fed to the impulse sealer, there is a cooling period in which the seals are "set" while the jaws remain closed. Round wire impulse sealers as described above, in combination with conventional flat faced heat sealing jaws, are satisfactory for form and fill machines when packaging liquids such as milk, water or other highly aqueous products. These liquids have relatively high thermal conductivities and thus aid in cooling of the seal after the sealing jaws are opened, i.e. the cooling effect of the liquid on the seal operates before the weight of the liquid can weaken or rupture the bottom seal. Sometimes, too, such liquids vaporize at temperatures below the sealing temperature of the sealing layer of the film and it is speculated that vaporization may aid in removing contamination from the seal area, i.e. the liquid may be "self voiding" from the seal area. Round wire impulse sealers are generally unsatisfactory on form, fill and seal machines when packaging thick flowable materials such as mayonnaise, chocolate fudge, scrambled egg mix, dressings, jams and the like. Other kinds of sealers are known, e.g. as disclosed in U.S. Pat. No. 3,692,613, which issued 1972 Sep. 19 to R. E. Pederson, in U.S. Pat. No. 4,115,182, which issued 1978 Sep. 19 to M. M. Wildmoser and U.S. Pat. No. 4,744,845, which issued 1988 May 17 to J. Posey. Heretofore, however, arrangements of heat sealing elements and heat sealing jaws have not been entirely satisfactory for sealing through thick flowable materials, especially those which contain high sugar concentrations, e.g. above about 50%, or high fat concentrations, e.g. above about 5%. One such material containing high concentrations of sugar and fat is chocolate fudge sundae topping. When sealing through materials it is important to void, as much as possible, the material from the seal area.

Other shapes of impulse heat sealing elements are known. For example, one heat sealing element is made from a flat strip of metal upon which is spot welded a round wire. Another is made from a flat strip of metal, bent so that the heat sealing element comprises two flat elongated fins adjoined by a segment of a tube, each lateral edge of said segment being adjoined to a lateral edge of one of the elongated fins. Such heat sealing elements are intended to provide sufficient pressure and heat at the wire or part-tubular portion to sever the flattened pouch and to form a heat sealed bead at the severed edge, and the angled flat strip/fins provide less pressure than at the tubular part and a decreasing pressure as a function of distance from the tubular part. This pressure and heat provides a wider seal band on the heat sealed film and assists in voiding the flowable material from the heat seal area.

It has been found that on vertical form, fill and seal machines with conventional heat seal assemblies excessive tension on either side of the transverse seal, while it is in a molten or semi-molten state, can elongate the seal and result in weak seals or in so-called "leakers" This can be caused by the weight of the filled pouch pulling down on the molten or semi-molten seal from beneath the jaw, i.e. on the top seal of the pouch. It can also be caused by the film pulling away from the molten or semi-molten seal on the upper side of the jaw, i.e. on the bottom seal of the pouch, due to tension in the film as the pouch is being filled with flowable material. Attempts have been made to overcome such problems. For example 1st Addition to French Patent No. 1 445 557, No. 91 657, granted 1968 Jun. 17 to Thimonnier & Co., Ltë, discloses means to grip the tubular film above and below the heat seal jaw. Such means are rigid and do not relieve the aforementioned tension to any substantial degree. The present invention seeks to improve the invention of Thimonnier and to minimize such problems.

Accordingly, the present invention provides a heat sealing assembly, for sealing at least two layers of thermoplastic film, comprising two jaws, resilient clamping elements and a heat sealing element, at least one of the jaws being capable of transverse motion and adapted to collapse a tubular film made from the thermoplastic film and passing between the jaws, each of said jaws having at least one of said elements mounted thereon, said clamping elements being adapted to grip thermoplastic film which passes therebetween and urge said gripped film towards said jaws when the jaws close and to release said film when the jaws open.

In one embodiment the heat sealing element is mounted on a first jaw and a resilient heat seal back-up pad is mounted on a second jaw, and a pair of clamping elements are mounted separately on one side of said jaws and are adapted i) to synchronously move with said jaws, ii) clamp film between said clamping elements when the jaws close and iii) cooperate in urging the clamped film towards the closed jaws.

In another embodiment there is one pair of resilient clamping elements on one side of the jaws and another pair of resilient clamping elements on the other side of the jaws.

In a further embodiment the clamping elements are made of rubber.

In yet another embodiment the resilient material has a thickness such that the ends of the cooperating portions are constructed such that the ends slope away from one another towards the part of the thickness furthest away from the jaws.

The invention also provides a process for slackening a tube of thermoplastic film in the immediate area of a transverse heat sealing jaw just before, during and just after the heat sealing jaws of the assembly are closed to form the transverse seal, said process comprising:

i) causing the tube to be advanced past a heat sealing assembly which comprises two jaws, at least one pair of resilient clamping elements and a heat sealing element, at least one of the jaws being capable of transverse motion and adapted to collapse the tube, one of said jaws having said heat sealing element mounted thereon, ii) gripping said tube with said clamping elements synchronous with the jaws moving towards each other and urging the gripped tube towards said heat sealing element with the clamping elements, such that the tube is slack in the area between the clamping elements and the heat sealing element, iii) holding the tube with the clamping elements while the tube is being gripped by the jaws and transversely sealed with the heat sealing element, and iv) releasing the tube from being gripped by the jaws and the clamping elements.

In one embodiment the tube is gripped by a pair of clamping elements mounted separately on one side of said jaws.

In yet another embodiment the tube is gripped by one pair of clamping elements on one side of the jaws and another pair of clamping elements on the other side of the jaws.

In yet another embodiment the tube is gripped by clamping elements which has a thickness such that the ends of the cooperating portions are constructed such that the ends slope away from one another towards the part of the thickness furthest away from the jaws.

DETAILED DESCRIPTION OF THE PREFERRED EMBODIMENTS

Figure 1:
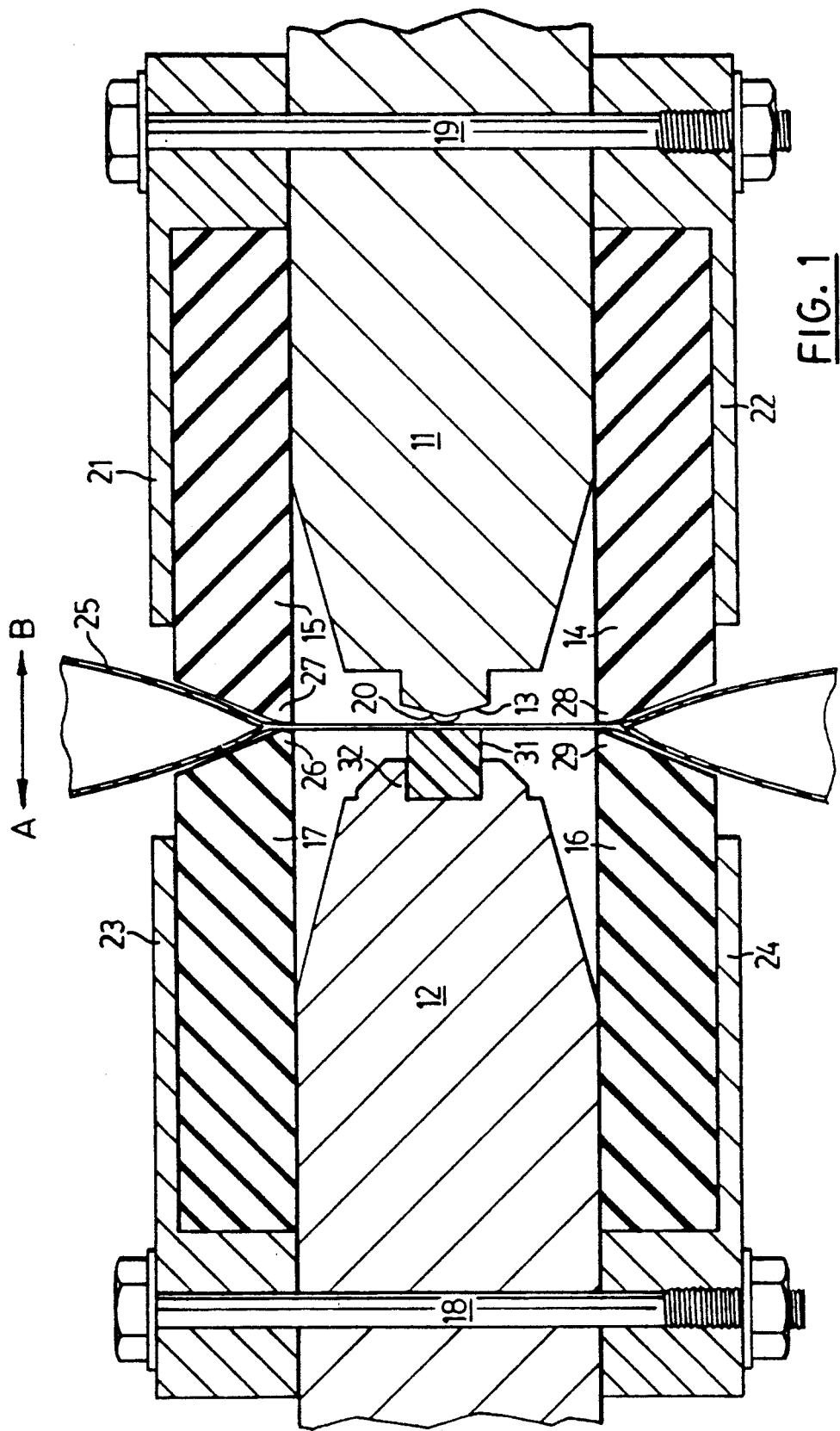
FIG. 1 is a cross-sectional view of one embodiment of the present invention.
Figure 2:
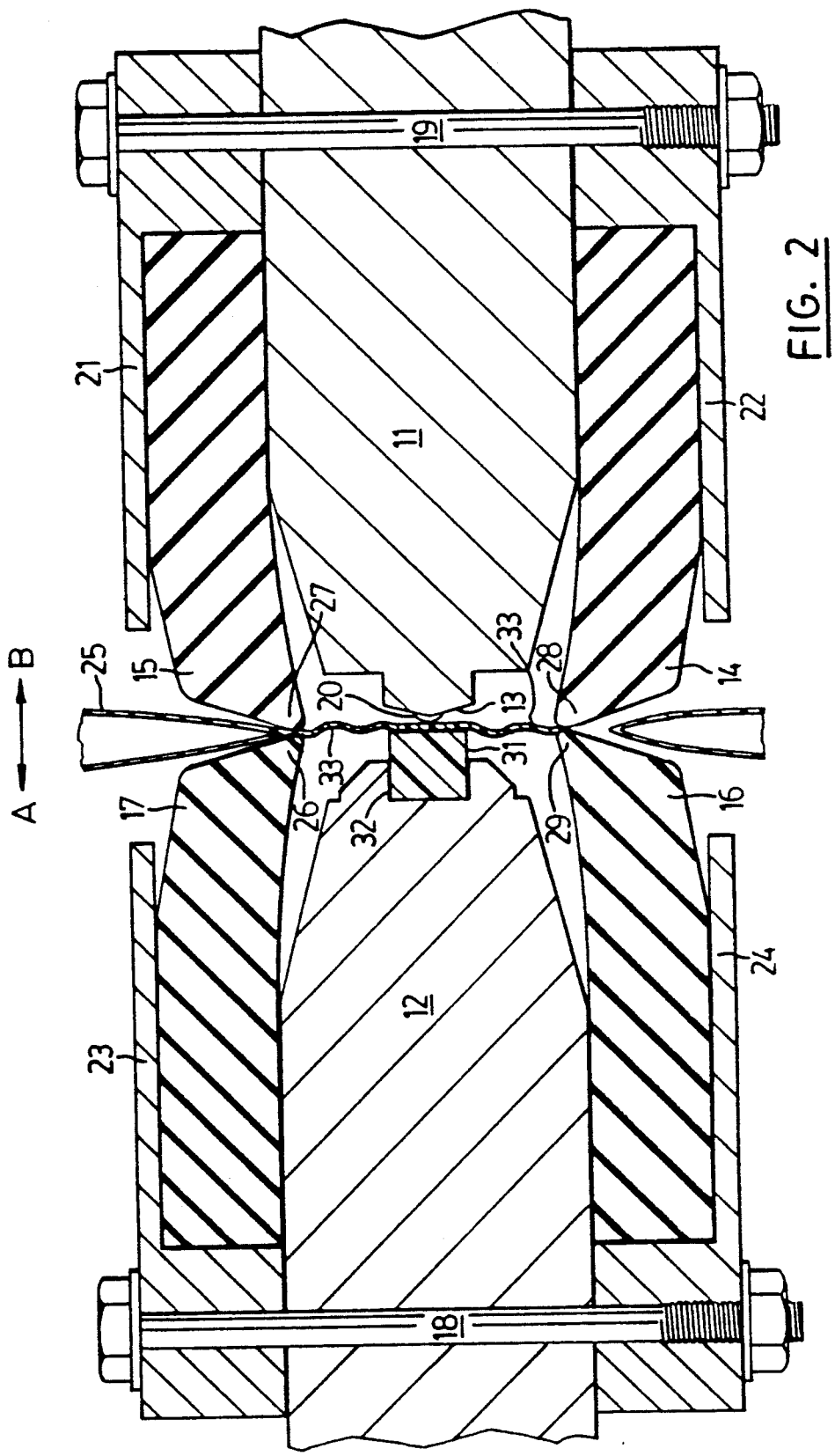
FIG. 2 shows the embodiment of FIG. 1 in which the jaws are closed more fully.

An embodiment of the invention is illustrated in the accompanying drawings. FIG. 1 is a cross-sectional view of one embodiment of the present invention, wherein the jaws have two pairs of clamping elements attached thereto and wherein the jaws are slightly apart from one another. FIG. 2 shows the embodiment of FIG. 1 in which the jaws are closed more fully.

The drawings show first heat sealing jaw 11 and second heat sealing jaw 12 which are mounted on a form and fill machine (not shown). Both jaws may move in the directions shown by arrows A and B respectively. Placed on face 13 of jaw 11 is at least one layer of woven glass fibre cloth (not shown) impregnated with polytetrafluoroethylene, or other suitable material, which acts primarily as an electrical insulator and at least in part as a thermal insulator between the metal of the jaw and a heat sealing element 20. Placed over the woven glass fibre cloth and over heat sealing element 20 is a further layer of woven glass fibre cloth (also not shown) impregnated with polytetrafluoroethylene, which acts primarily to prevent sticking and burning of the thermoplastic film which, but for the cloth, would come into contact with heat sealing element 20. Heat sealing element 20 is attached to an electrical impulse-providing apparatus (not shown). Second jaw 12 has a longitudinal channel 32 therein, in which is held a heat resistant resilient pad 31, e.g. a silicone rubber pad. Although not shown, it is usual to cover rubber pad 31 with a further woven glass fibre cloth impregnated with polytetrafluoroethylene.

Jaw 11 has secured thereto resilient material, e.g. rubber clamping elements 14 and 15 and jaw 12 has secured thereto resilient material, e.g. rubber clamping elements 16 and 17. Clamping elements 14 and 15 are secured to jaw 11 by bolt 19 and keepers 21 and 22, and clamping elements 16 and 17 are secured to jaw 12 by bolt 18 and keepers 23 and 24.

During operation, the jaws 11 and 12 start apart. A thermoplastic film tube 25 is passed between jaws 11 and 12. The film tube is collapsed transversely as jaws 11 and 12 are caused to approach one another. As jaws 11 and 12 close, the film tube is trapped between heat seal element 20 and silicone rubber pad 31. Simultaneously, the film tube 25 is trapped between the cooperating ends 26 and 27 of clamping elements 15 and 17 respectively, and between cooperating ends 28 and 29 of clamping elements 14 and 16 respectively. As the jaws are closed tighter the cooperating ends of the clamping elements move towards the heat sealing element. Such movement is facilitated by the presence of the keepers and the slopes of the end faces of the clamping elements. Such movement, as shown in FIG. 2, causes the film tube between the clamping elements and the heat seal to slacken, as shown at 33, thus allowing the transverse heat seal to be made substantially without the effect of tension on the seal either from the weight of the pouch pulling downwards on the seal, or from the film pulling upwards, away from the seal, due to the tension created in the film as the flowable material fills the film tube above the transverse seal. An electrical impulse is fed through heat sealing element 20. The electrical impulse heats the heat sealing element 20 sufficiently to heat seal the adjacent tubular film surfaces. In the particular embodiment shown in the drawing the heat seal element is designed to also simultaneously sever the sealed film in a manner known in the art. The electrical impulse is then switched off to allow the heat sealing element 20 and the sealed and severed tube to cool sufficiently to "set" the seals. Heat is thus transferred from the hot areas of the sealed film tube, through the metallic heat sealing element 20 to jaw 11. The jaws are then caused to move apart in order to release the film, both by the clamping elements and by the nip between the heat sealing element 20 and pad 31. The seals thus formed are the top seal of a sealed pouch and the bottom seal of the next-to-be-formed pouch.

There are several factors which affect the performance and effectiveness, and therefore the selection, of clamping elements. For example, the hardness and geometry of rubber used for the elements will affect the clamping pressure and effectiveness. The term "geometry" refers to the width and thickness of the rubber, the shape of the tips of the clamping elements, and any scalloping of the body of the rubber, among other things. Those skilled in the art will require to make simple experiments to determine the best hardness, geometry and positioning of the clamping elements for best effectiveness.

I claim:

1. A process for heat sealing pouches from a tube of thermoplastic film in a vertical form, fill and seal machine, said machine having an opposing pair of jaws facing the tube, at least being capable of moving toward and away from the other jaw to collapse the tube therebetween; a heat sealing element on one jaw facing the tube; and a pad on the other jaw facing the heat sealing element, said process comprising the steps of:
1) gripping the tube with top clamping elements at a top gripping point above the heat sealing element and with bottom clamping elements at a bottom gripping point below the heat sealing element;
2) moving the top gripping point and bottom gripping point toward the heat sealing element thereby relieving tension and forming a slack section in the film of the tube between the top clamping elements and the bottom clamping elements;
3) moving the heat seal element and the pad toward each other to meet in the slack section of the tube;
4) activating the heat seal element to produce a top heat seal of a previously filled pouch and a bottom heat seal of a next-to-be-filled pouch, said top and bottom heat seals being in the slack section of the tube;
6) severing the tube between the top and bottom heat seals;
7) deactivating and moving the heat seal element and pad away from said heat seals; and
8) releasing the tube from the top and bottom clamping elements.

2. A heat sealing assembly for a vertical form, fill and seal machine for production of pouches from a tube of thermoplastic film, comprising:
a) two jaws on opposite sides of the tube, at least one of said jaws being capable of moving toward and away from the other jaw;
b) a heat sealing element on one jaw facing the tube;
c) a pad on the other jaw facing the heat sealing element; and
d) on each of said jaws said assembly further comprising:
  1) a top clamping means mounted above the heat sealing element and pad of the jaws for gripping the tube above the heat sealing element and urging the tube toward the heat sealing element to relieve tension on the tube between the heat sealing element and the top clamping means, and
  2) a bottom clamping means mounted below the heat sealing element and pad of the jaws for gripping the tube below the heat sealing element and urging the tube toward the heat sealing element to relieve tension on the tube between the heat sealing element and the bottom clamping means;
said clamping means being adapted to act in concert with the movement of the two jaws to collapse the tube and make a heat seal substantially without the effect of tension in the seal.

3. A heat sealing assembly of claim 2 wherein said top clamping means is a top clamping element of resilient material having a bottom surface; and wherein said bottom clamping means is a bottom clamping element of resilient material having a top surface; said clamping elements each having a sloping end facing the tube for engaging, collapsing and urging the tube toward the heat seal element thereby enabling a heat seal to be made without the effect of tension in the seal.

4. A heat sealing assembly of claim 3 wherein said sloping ends are defined by a thick cross-section distant from the heat seal element and a thin cross-section closer to the heat seal element; the thin cross-section of the top clamping element being adjacent said bottom surface and the thin cross-section of the bottom clamping element being adjacent said top surface.

* * * * *